(12) United States Patent
Xia et al.

(10) Patent No.: US 10,754,715 B2
(45) Date of Patent: Aug. 25, 2020

(54) APPLICATION PROGRAM CONTROL METHOD AND APPARATUS, TERMINAL, AND STORAGE MEDIUM

(71) Applicant: TENCENT TECHNOLOGY (SHENZHEN) COMPANY LIMITED, Shenzhen (CN)

(72) Inventors: Furong Xia, Shenzhen (CN); Heyun Lu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/537,768

(22) Filed: Aug. 12, 2019

(65) Prior Publication Data

US 2019/0361756 A1 Nov. 28, 2019

Related U.S. Application Data

(63) Continuation of application No. PCT/CN2018/095342, filed on Jul. 12, 2018.

(30) Foreign Application Priority Data

Jul. 14, 2017 (CN) .......................... 2017 1 0573725

(51) Int. Cl.
*G06F 9/54* (2006.01)
*G06F 9/451* (2018.01)
(Continued)

(52) U.S. Cl.
CPC ............ *G06F 9/542* (2013.01); *G06F 3/0414* (2013.01); *G06F 3/0416* (2013.01); *G06F 8/65* (2013.01); *G06F 9/451* (2018.02); *G06F 9/546* (2013.01)

(58) Field of Classification Search
CPC .............................. G06F 9/4843; G06F 9/542
(Continued)

(56) References Cited

U.S. PATENT DOCUMENTS 8,572,508 B2 * 10/2013 Lin ..................... G06F 3/04883
345/173
9,342,237 B2 * 5/2016 Zeng ................... G06F 3/04883
(Continued)

FOREIGN PATENT DOCUMENTS

CN 103155520 A 6/2013
CN 104035760 A 9/2014
(Continued)

OTHER PUBLICATIONS

The World Intellectual Property Organization (WIPO) International Search Report for PCT/CN2018/095342 dated Aug. 31, 2018 5 Pages (including translation).
(Continued)

*Primary Examiner* — Andy Ho
(74) *Attorney, Agent, or Firm* — Anova Law Group, PLLC

(57) ABSTRACT

An application program control method is provided for a terminal. The terminal is installed with a virtual engine and an application program, the application program is a program developed based on the virtual engine, and the application program includes an outer program and an inner program. The method includes intercepting, by using the virtual engine, a pressure-touch event, the pressure-touch event comprising operation coordinates and a pressure value; transferring, by using the virtual engine, the pressure-touch event to the outer program; transferring, by using the outer program, the pressure-touch event to the inner program; and performing, by using the inner program, a predetermined operation according to the pressure-touch event.

18 Claims, 13 Drawing Sheets

(51) Int. Cl.
*G06F 3/041* (2006.01)
*G06F 8/65* (2018.01)

(58) Field of Classification Search
USPC .......................................... 718/100; 719/318
See application file for complete search history.

(56) References Cited

U.S. PATENT DOCUMENTS

| | | |
|---|---|---|
| 9,901,821 B2 * | 2/2018 | Matsui .................. A63F 13/533 |
| 2012/0033673 A1 | 2/2012 | Goel |
| 2015/0363142 A1 | 12/2015 | Sumi et al. |

FOREIGN PATENT DOCUMENTS

| | | |
|---|---|---|
| CN | 105521603 A | 4/2016 |
| CN | 106095666 A | 11/2016 |
| CN | 106293753 A | 1/2017 |
| CN | 107357586 A | 11/2017 |

OTHER PUBLICATIONS

The State Intellectual Property Office of the People's Republic of China (SIPO) Office Action 1 for 201710573725.3 dated Mar. 8, 2018 6 Pages (including translation).

\* cited by examiner

APPLICATION PROGRAM CONTROL METHOD AND APPARATUS, TERMINAL, AND STORAGE MEDIUM

RELATED APPLICATION

This application is a continuation application of PCT Patent Application No. PCT/CN2018/095342, filed on Jul. 12, 2018, which claims priority to Chinese Patent Application No. 201710573725.3, filed with the Chinese Patent Office on Jul. 14, 2017, and entitled "APPLICATION PROGRAM CONTROL METHOD, APPARATUS, AND DEVICE", content of all of which is incorporated herein by reference in its entirety.

FIELD OF THE TECHNOLOGY

Embodiments of this application relate to the field of man-machine interaction and, in particular, to an application program control method and apparatus, a terminal, and a storage medium.

BACKGROUND

There are many application programs developed by using a virtual engine on a mobile terminal. Especially, there are many application programs developed by using a three-dimensional virtual engine, for example, a virtual reality (VR) application program, a three-dimensional map program, a first-person shooting (FPS) game, and a multiplayer online battle arena game (MOBA).

A three-dimensional virtual engine commonly used at present is a Unity engine. Using an example in which an application program is an FPS game application program developed by the Unity engine, when a user uses the FPS game application program, several virtual keys are displayed on a user interface (UI), and the user presses the virtual key to control a game character to move forward, move back, turn around, fire, and perform another action.

Although some mobile terminals are equipped with a pressure touchscreen, the current Unity engine cannot directly support a pressure touch function. Consequently, an application program developed based on the Unity engine cannot be controlled by using a pressure touch technology.

SUMMARY

To resolve a problem that an application program developed based on a Unity engine cannot be controlled by using a pressure touch technology, embodiments of the present disclosure provide an application program control method and apparatus, a terminal, and a storage medium.

According to one aspect of the present disclosure, an application program control method is provided for a terminal. The terminal is installed with a virtual engine and an application program, the application program is a program developed based on the virtual engine, and the application program includes an outer program and an inner program. The method includes intercepting, by using the virtual engine, a pressure-touch event, the pressure-touch event comprising operation coordinates and a pressure value; transferring, by using the virtual engine, the pressure-touch event to the outer program; transferring, by using the outer program, the pressure-touch event to the inner program; and performing, by using the inner program, a predetermined operation according to the pressure-touch event.

According to another aspect of the present disclosure, an application program control apparatus is provided. The apparatus includes a memory storing computer program instructions; and one or more processors coupled to the memory. When executing the computer program instructions, the processors are configured to perform: running a virtual engine and an application program, wherein the application program is a program developed based on the virtual engine, and the application program includes an outer program and an inner program; intercepting, by using the virtual engine, a pressure-touch event, the pressure-touch event comprising operation coordinates and a pressure value; transferring, by using the virtual engine, the pressure-touch event to the outer program; transferring, by using the outer program, the pressure-touch event to the inner program; and performing, by using the inner program, a predetermined operation according to the pressure-touch event.

According to another aspect of the present disclosure, a non-transitory computer-readable storage medium is further provided. The storage medium stores computer program instructions executable by at least one processor to perform: running a virtual engine and an application program, wherein the application program is a program developed based on the virtual engine, and the application program includes an outer program and an inner program; intercepting, by using the virtual engine, a pressure-touch event, the pressure-touch event comprising operation coordinates and a pressure value; transferring, by using the virtual engine, the pressure-touch event to the outer program; transferring, by using the outer program, the pressure-touch event to the inner program; and performing, by using the inner program, a predetermined operation according to the pressure-touch event.

By using the disclosed technical solutions, a pressure touch event is transferred to an outer program of an application program, and then transferred from an outer program of the application program to an inner program of the application program; and the inner program performs a preset operation according to the pressure touch event, thereby resolving a problem that the inner program of the application program cannot be directly run in an operating system, and can be normally run only after the outer program is added, but because of the existence of the outer program, the application program cannot directly process the pressure touch event, to implement input control, by using a pressure touch technology, in an application program developed based on a three-dimensional virtual engine, and trigger a plurality of control instructions in a limited screen area of the mobile terminal, thereby improving man-machine interaction efficiency.

BRIEF DESCRIPTION OF THE DRAWINGS

To describe the technical solutions in the embodiments of the present disclosure more clearly, the following briefly describes the accompanying drawings for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

To make objectives, technical solutions, and advantages of the embodiments of the present disclosure clearer, the following further describes in detail certain embodiments of the present disclosure with reference to the accompanying drawings.

A Unity engine is a common virtual engine, and an application program developed based on the Unity engine is usually compiled by using a C# programming language. When the application program developed based on the Unity engine is released to different operating systems, because different operating systems support different programming languages, the application program needs to be adaptively modified. For example, if an Android operating system supports an application program developed by using a Java programming language, an application program compiled based on the C# programming language can be normally run in the Android operating system only after an outer program compiled by using the Java programming language is added to the application program compiled based on the C# programming language. For another example, if an iOS operating system supports an application program developed by using an Object-C programming language, an application program compiled based on the C# programming language can be normally run in the iOS operating system only after an outer program compiled by using the Object-C programming language is added to the application program compiled based on the C# programming language.

Because of the existence of the outer program, the application program compiled by using the C# programming language often cannot obtain a pressure touch event of a bottom layer of the operating system, and, consequently, a pressure touch technology often cannot be supported. Embodiments of the present disclosure are provided to resolve this and/or other technical problems to some extent.

Figure 1:
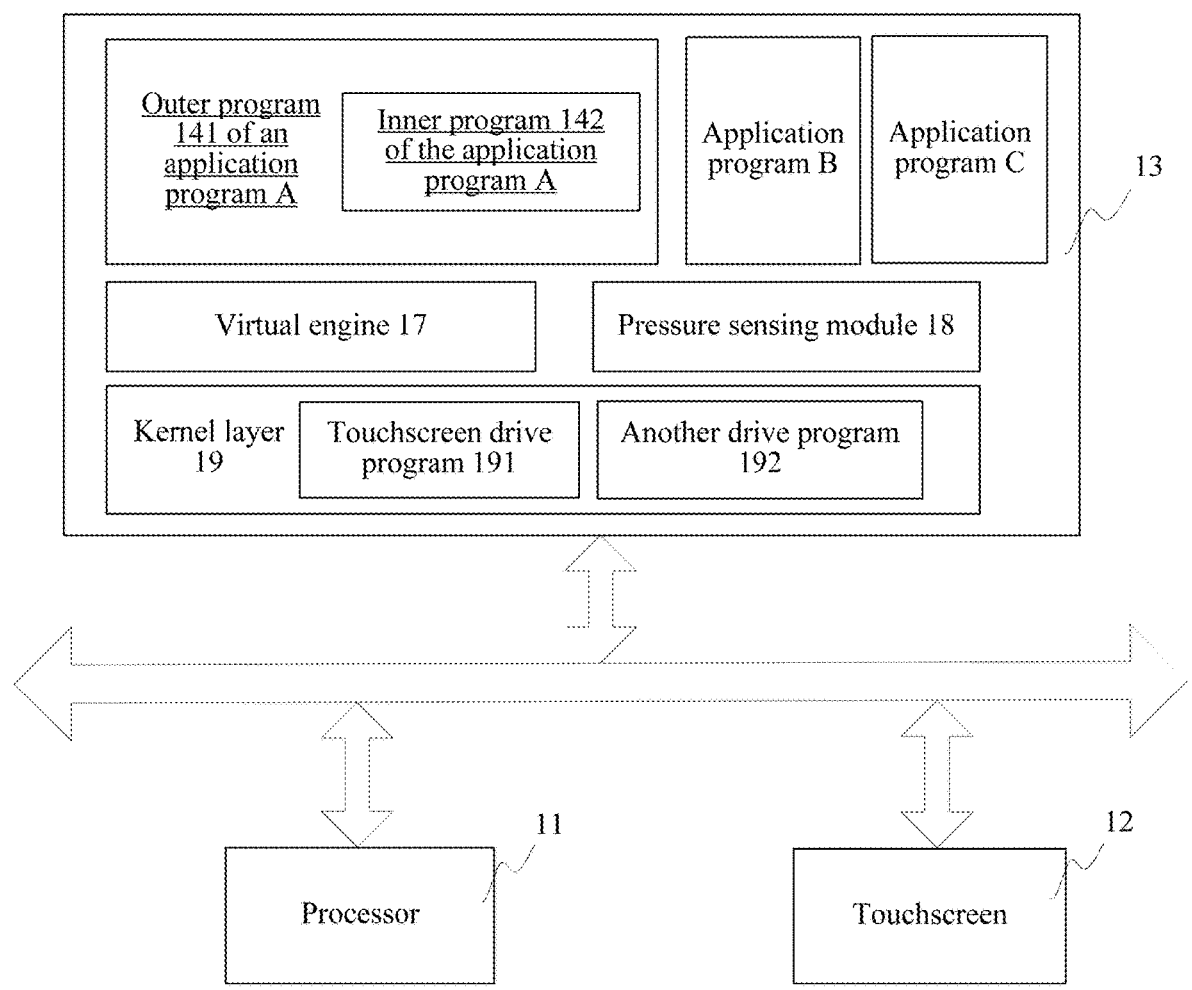
FIG. 1 is a schematic structural diagram of a terminal according to an exemplary embodiment of the present disclosure.

FIG. 1 is a schematic structural diagram of a terminal according to an exemplary embodiment of the present disclosure. As shown in FIG. 1, the terminal includes a processor 11, a touchscreen 12, and a memory 13.

The processor 11 may be at least one of a single-core processor, a multi-core processor, an embedded chip, and a processor having an instruction running capability.

The touchscreen 12 is a pressure-sensing touchscreen. The pressure-sensing touchscreen may measure pressing strength of a touch on the touchscreen 12.

The memory 13 stores executable programs of the processor 11. For example, the memory 13 stores an application program A, an application program B, an application program C, a virtual engine 17, a pressure-sensing module 18, and a kernel layer 19 of an operating system. The application program A includes an outer program 141 of the application program A and an inner program 142 of the application program A. The application program A is an application program developed based on the virtual engine 17, the outer program of the application program A is developed by using a first programming language, and the inner program of the application program A is developed by using a second programming language. Optionally, the first programming language is a development language directly supported by an application layer of the operating system, the second programming language is a programming language used during initial development of the application program, and the first programming language and the second programming language are two different programming languages. In addition, when there is no outer program of the application program A, the inner program of the application program A cannot be directly run in the operating system.

The outer program of the application program A includes the inner program of the application program A. Optionally, the application program A includes at least one of a game program developed by the virtual engine 17, a VR program, a three-dimensional map program, and a three-dimensional demonstration program. For example, when the operating system of the terminal uses an Android operating system, the outer program of the application program A is developed by using a Java programming language, and the inner program of the application program A is developed by using a C# language. For another example, when the operating system of the terminal uses an iOS operating system, the outer program of the application program A is developed by using an Object-C programming language, and the inner program of the application program A is developed by using a C# language.

The virtual engine 17 is an interactive engine supporting a plurality of operating systems. For example, the virtual engine may be applied to program development in a plurality of fields such as the game development field, the VR field, and the three-dimensional map field. The virtual engine includes a three-dimensional virtual engine, a two-dimensional virtual engine, and the like. A specific type of the virtual engine 17 is not limited in the embodiments of the present disclosure. An example in which the virtual engine 17 is a three-dimensional virtual engine, especially a Unity engine is used in the following embodiment for description.

The pressure-sensing module 18 is a module configured to receive a pressure-touch event reported by a touchscreen drive program 191. The pressure-touch event includes a pressure value and coordinate values of a pressure-touch event. The coordinate values are used to indicate a touch location of a pressure-touch operation on a display screen. Optionally, a horizontal coordinate axis is established in a horizontal direction of the display screen, and a vertical coordinate axis is established in a vertical direction of the display screen, to obtain a two-dimensional coordinate system.

For example, the kernel layer 19 includes the touchscreen drive program 191 and another drive program 192. The touchscreen drive program 191 is a module configured to detect a pressure-touch event. When detecting the pressure-touch event, the touchscreen drive program 191 transfers the pressure-touch event to the pressure-sensing module 18.

The another drive program 192 may be a drive program related to the processor 11, a drive program related to the memory 13, a drive program related to a network component, a drive program related to a sound component, or the like.

A person skilled in the art can understand that, the foregoing is merely a general illustration of a structure of the terminal. In different embodiments, the terminal may have more or fewer components. For example, the terminal may further include a gravity acceleration sensor, a gyro sensor, and a power supply.

Figure 2:
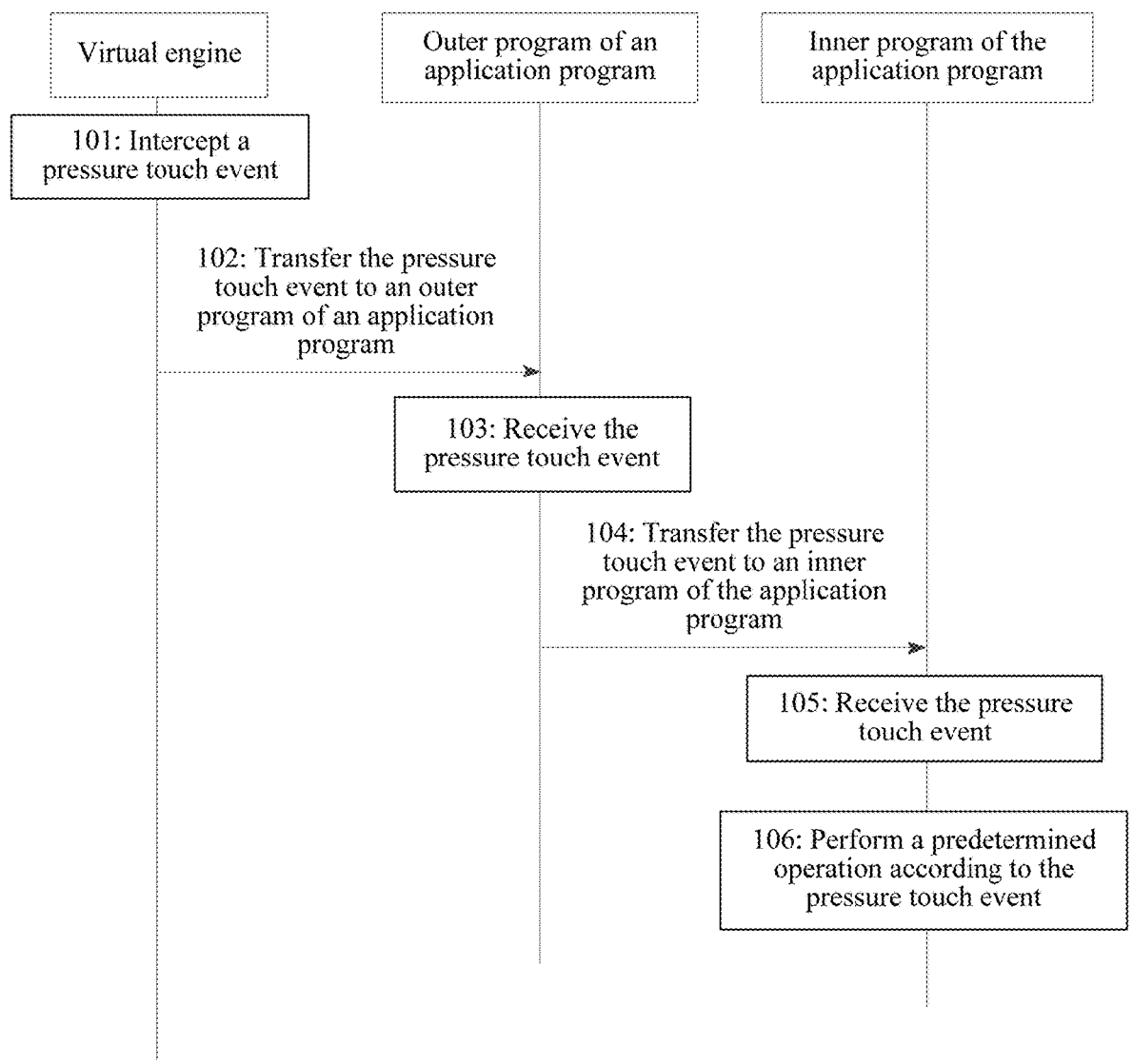
FIG. 2 is a flowchart of an application program control method according to an exemplary embodiment of the present disclosure.

FIG. 2 is a flowchart of an application program control method according to an exemplary embodiment of the present disclosure. In this embodiment, an example in which the application program control method is applied to the terminal shown in FIG. 1 is used for description. The method includes the followings.

Step 101: A virtual engine intercepts a pressure-touch event.

The pressure-touch event is a touch event triggered on a touchscreen by using a pressure touch technology. In one embodiment, the virtual engine is an engine used by the application program A.

When a user uses the application program A, a UI of the application program A is displayed on the touchscreen 12 of the terminal. The UI includes a control used for man-machine interaction, for example, a virtual button. When the user performs a pressure-touch operation on the touchscreen, the touchscreen drive program 191 of the terminal generates a pressure-touch event, and reports the pressure-touch event to the pressure-sensing module 18. The pressure-sensing module 18 sends the pressure-touch event in a form of a message to at least one application program, and the virtual engine intercepts the pressure-touch event.

Step 102: The virtual engine transfers the pressure-touch event to an outer program of an application program.

The outer program of the application program is developed by using a first programming language. Optionally, the first programming language is a development language directly supported by an application layer of an operating system, for example, a development language supported by an application layer of an Android operating system is Java, and a development language supported by an application layer of an iOS operating system is Object-C or the like. Other operating systems or languages may also be included.

In one embodiment, the application program A is an application program developed based on the virtual engine. After intercepting the pressure-touch event, the virtual engine transfers the pressure-touch event to the outer program of the application program A. The pressure-touch event includes a pressure value and coordinate values of the event.

Step 103: The outer program of the application program receives the pressure-touch event.

The pressure-touch event includes the pressure value and the coordinate values of the event.

Step 104: The outer program of the application program transfers the pressure-touch event to an inner program of the application program.

The inner program of the application program is developed by using a second programming language. Optionally, the second programming language is a programming language used when the application program is originally developed, and the programming language includes at least one of a C language, a Java language, a C# language, a C++ language, or a Python language. The second programming language being the C# language is used as an example for description, not intended to be limited.

Step 105: The inner program of the application program receives the pressure-touch event.

Step 106: The inner program of the application program performs a predetermined operation according to the pressure-touch event.

For example, a first predetermined operation is performed when the pressure value of the pressure-touch event is greater than a preset threshold; or a second predetermined operation is performed when the pressure value of the pressure-touch event is less than a preset threshold.

Thus, according to the application program control method provided in one embodiment of the present disclosure, a pressure-touch event is transferred to an outer program of an application program, and then transferred from an outer program of the application program to an inner program of the application program; and the inner program performs a preset operation according to the pressure-touch event. This resolves the problem that the inner program of the application program cannot be directly run in an operating system, and can be normally run only after the outer program is added, but because of the existence of the outer program, the application program cannot directly process the pressure-touch event to implement input control by using a pressure-touch technology in an application program developed based on a virtual engine. Further, this approach can trigger a plurality of operation instructions in a limited screen area of the mobile terminal, thereby improving man-machine interaction efficiency.

Figure 3:
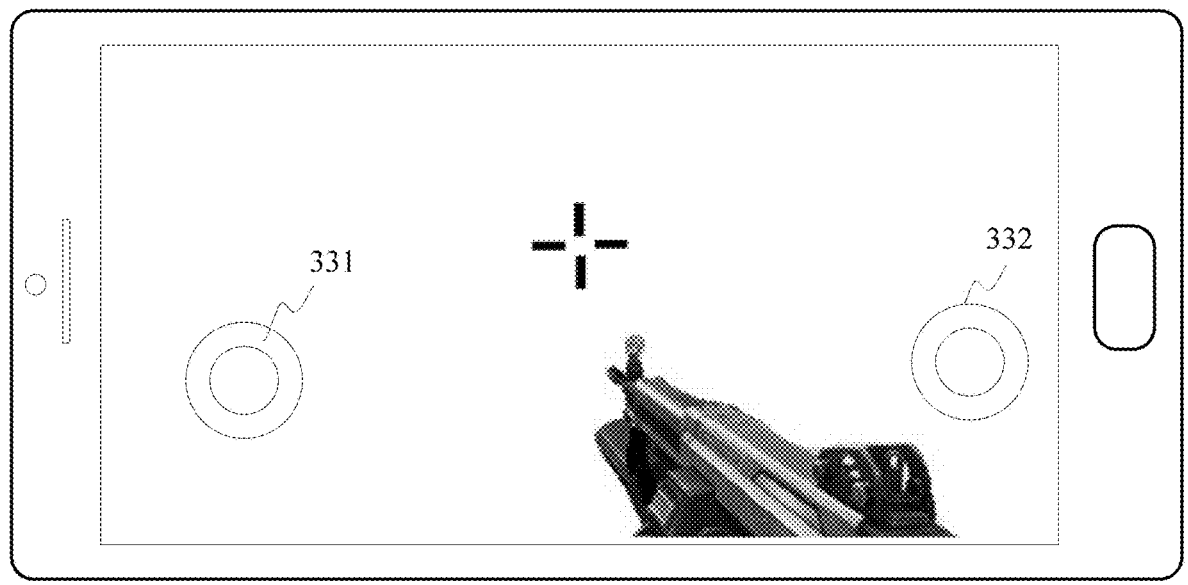
FIG. 3 is a schematic interface diagram of an application program control method during implementation according to an exemplary embodiment of the present disclosure.

FIG. 3 is a schematic interface diagram of an application program control method during specific implementation according to an exemplary embodiment of the present disclosure. In a specific example, as shown in FIG. 3, an application program on a terminal that is run in the foreground is an FPS game. The application program is a game application program developed based on a virtual engine. A UI run in the foreground is an interface in the game in which shooting is performed at a first view of angle of a player, and the interface includes a first control 331 configured to move a character location and a second control 332 configured to move a location of a view of angle.

The first control 331 is a control configured to move the character location. Because a game character is a virtual character located in a three-dimensional virtual environment, a user may control, by using the first control 331, the virtual character to move forward, move back, move to the left, or move to the right in the three-dimensional virtual environment. For example, if the user slides the first control 331 vertically upward, the terminal moves the virtual character to move forward in the three-dimensional virtual environment; if the user slides the first control 331 vertically downward, the terminal moves the virtual character to move back in the three-dimensional virtual environment; if the user slides the first control 331 to the left horizontally, the terminal moves the virtual character to the left in the three-dimensional virtual environment; or if the user slides the first control 331 to the right horizontally, the terminal moves the virtual character to the right in the three-dimensional virtual environment.

The second control 332 is a control configured to control a view of angle direction of the first view of angle. For example, the user slides the second control 332 normally or with relatively low pressure and slides the second control 332 to the left horizontally, an inner program of the application program determines that a pressure value does not exceed a predetermined threshold, and the application program rotates the first view of angle in the game to the left; if the user slides the first control 331 to the right horizontally, the first view of angle of the user in the game is rotated to the right; if the user slides the first control vertically upward, a subject view of angle of the user in the game is rotated upward; or if the user slides the second control 332 vertically downward, a subject view of angle of the user in the game is rotated downward.

In addition, the second control 332 may be further configured to trigger a firing operation. When the user presses the second control 332 with relatively high pressure, the inner program of the application program determines that a pressure value exceeds the predetermined threshold, and the application program controls the game character to perform a firing operation. That is, the user can implement two different control operations on the second control 332 through pressure-touch operations with different pressure values.

In some embodiments, the virtual engine provides a message forwarding code.

The message forwarding code is used for forwarding a pressure-touch event to the inner program 232 by default. However, because of the existence of the outer program 231, the message forwarding code fails to be forwarded, and cannot be effectively executed. In this case, the message forwarding code of the virtual engine needs to be modified. Therefore, the present disclosure further provides the following embodiments.

Figure 4:
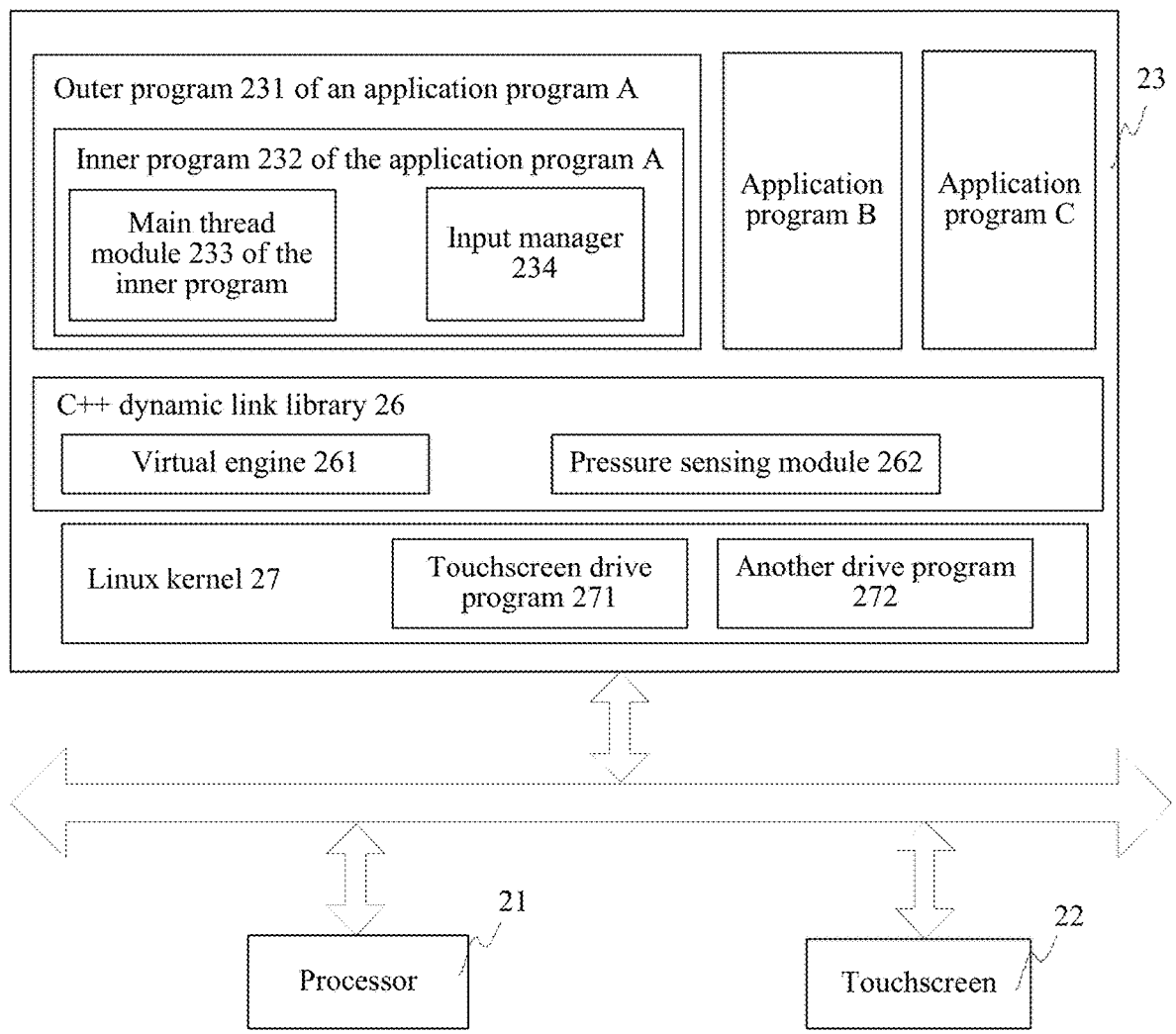
FIG. 4 is a schematic structural diagram of a terminal according to another exemplary embodiment of the present disclosure.

FIG. 4 is a schematic structural diagram of a terminal according to another exemplary embodiment of the present disclosure. For example, the terminal that uses a first operating system is used. The first operating system is an operating system in which a touchscreen drive program directly sends a pressure-touch event to an application layer without using a graphical user interface (GUI). The first operating system includes an Android operating system.

A processor 21 may be at least one of a single-core processor, a multi-core processor, an embedded chip, and a processor having an instruction running capability.

A touchscreen 22 is a pressure-sensing touchscreen. The pressure-sensing touchscreen may measure pressing strength on the touchscreen 12.

A memory 23 stores an executable program of the processor 21. For example, the memory 23 stores an application program A, an application program B, an application program C, a C++ dynamic link library 26, a virtual engine 261, a pressure-sensing module 262, and a kernel layer 27 of an operating system. For example, the application program A includes an outer program 231 of the application program A and an inner program 232 of the application program A. The application program A is an application program developed based on the virtual engine 261, the outer program of the application program A is developed by using a first programming language, and the inner program of the application program A is developed by using a second programming language. Optionally, the first programming language is a development language directly supported by an application layer of the operating system, the second programming language is a programming language used during initial development of the application program, and the first programming language and the second programming language are two different programming languages. In addition, when there is no outer program of the application program A, the inner program of the application program A cannot be directly run in the operating system. The outer program of the application program A includes the inner program of the application program A. Optionally, the application program A includes at least one of a game program developed by the virtual engine 261, a VR program, a three-dimensional map program, and a three-dimensional demonstration program. For example, when the operating system of the terminal uses an Android operating system, the outer program of the application program A is developed by using a Java programming language, and the inner program of the application program A is developed by using a C# language. For another example, when the operating system of the terminal uses an iOS operating system, the outer program of the application program A is developed by using an Object-C programming language, and the inner program of the application program A is developed by using a C# language.

For example, the kernel layer 27 includes a touchscreen drive program 271 and another drive program 272. The touchscreen drive program 271 is a module configured to detect a pressure-touch event. When detecting the pressure-touch event, the touchscreen drive program 271 transfers the pressure-touch event to the pressure-sensing module 262.

The another drive program 272 may be a drive program related to the processor 21, a drive program related to the memory 23, a drive program related to a network component, a drive program related to a sound component, or the like.

When the terminal shown in FIG. 4 uses the first operating system, the inner program 232 of the application program A further includes a main thread module 233 and an input manager 234 of the inner program. The C++ dynamic link library 26 further includes a virtual engine 261 and a pressure-sensing module 262.

The C++ dynamic link library is a manner for implementing a concept of function library sharing. The dynamic link library allows a process to invoke a function that does not belong to executable code of the dynamic link library, and the dynamic link library may apply an update function to each module of the application program without affecting another part of the program. In other words, the application program A may invoke each module in the C++ dynamic link library 26, but each module in the C++ dynamic link library 26 may be considered as executable code that does not belong to the application program A.

The pressure-sensing module 262 includes a preset program. The preset program is a program configured to modify the message forwarding code of the virtual engine.

Figure 5:
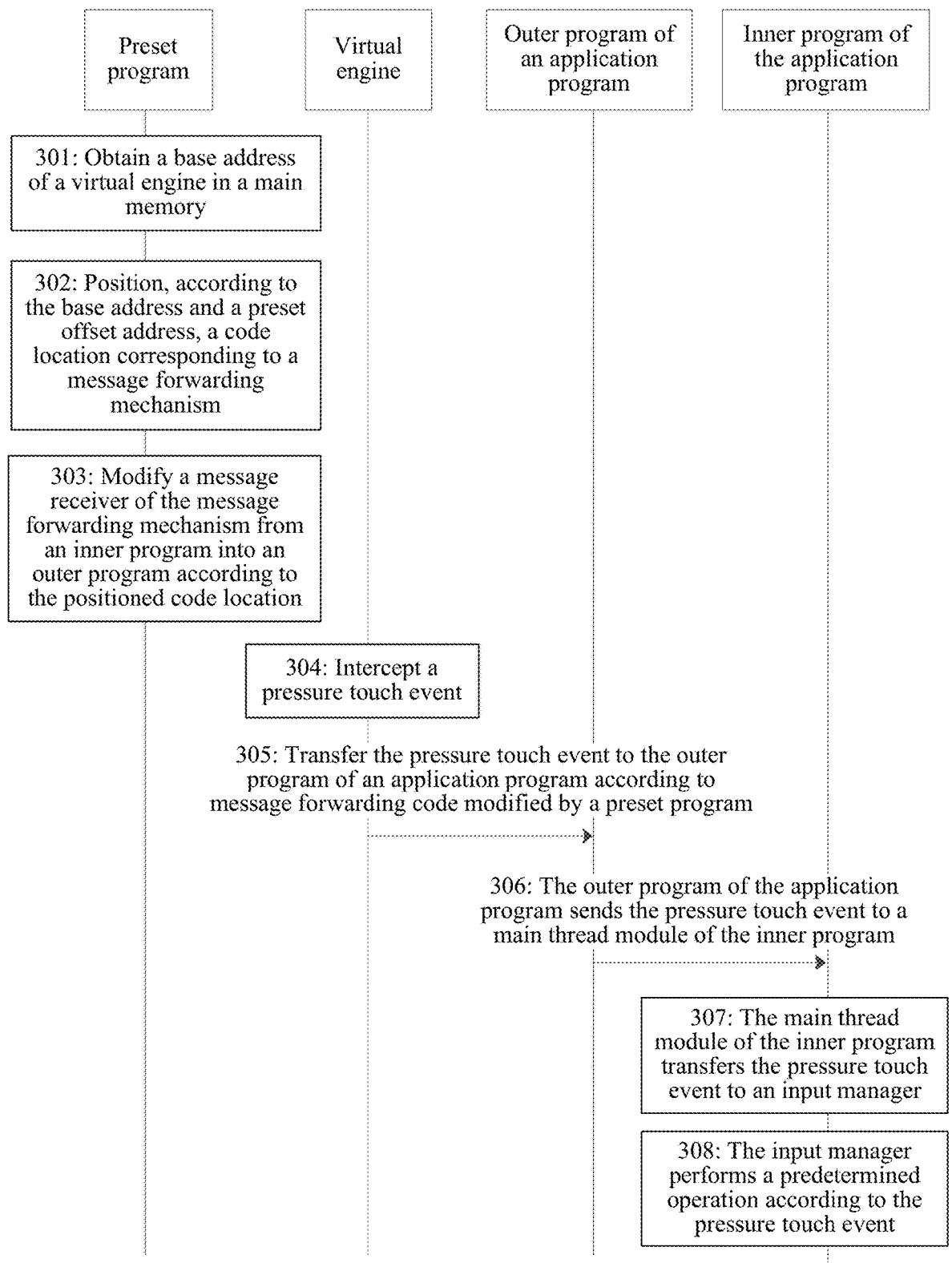
FIG. 5 is a flowchart of an application program control method according to another exemplary embodiment of the present disclosure.

FIG. 5 is a flowchart of an application program control method according to another exemplary embodiment of the present disclosure. In one embodiment, an example in which the application program control method is applied to the terminal shown in FIG. 4 is used for description. The method includes the followings.

Step 301: A preset program obtains a base address of a virtual engine in a main memory.

After the application program A is started, the preset program in the C++ dynamic link library 26 obtains a base address used when the virtual engine is run in a main memory. The preset program may obtain the base address of the virtual engine in the main memory in a disassembly form.

Addressing in the main memory means that a code location of data or an instruction is found from the main memory. For the addressing in the main memory, an instruction or a code location needs to be positioned by using a base address and an offset address.

Step 302: The preset program determines, according to the base address and a preset offset address, a code location corresponding to message forwarding code.

The message forwarding code is message forwarding code preset in the virtual engine. The message forwarding code is used for forwarding the intercepted pressure-touch event to an inner program.

The preset program determines the code location of the message forwarding code in the main memory according to the obtained base address and the preset offset address.

Step 303: The preset program modifies a message receiver of the message forwarding code from an inner program into an outer program according to the positioned code location.

Because the pressure-touch event first needs to be transferred to the outer program and then transferred by the outer program to the inner program, after positioning the code location of the message forwarding code, the preset program modifies the message receiver of the message forwarding code from the inner program into the outer program.

Step 304: A virtual engine intercepts a pressure-touch event.

When a user uses the application program, a UI of the application program is displayed on the touchscreen of the terminal. The UI includes a control used for man-machine interaction, for example, a virtual button. When the user performs a pressure-touch operation on the touchscreen, the touchscreen drive program of the terminal generates a pressure-touch event, and reports the pressure-touch event to the pressure-sensing module. The virtual engine intercepts the pressure-touch event.

Step 305: The virtual engine transfers the pressure-touch event to an outer program of the application program according to the message forwarding code modified by the preset program.

Because in the modified message forwarding code, a destination address of the pressure-touch event is modified from the inner program into the outer program, when intercepting the pressure-touch event, the virtual engine transfers the pressure-touch event to the outer program of the application program according to the modified message forwarding code.

Step 306: The outer program sends the pressure-touch event to a main thread of the inner program.

Step 307: The inner program transfers the pressure-touch event to an input manager of the inner program by using the main thread.

The input manager is a program module in the inner program that is responsible for processing an external input signal. For example, the input manager is configured to manage a pressure-touch event triggered by a virtual key displayed on the UI. It can be learned by referring to FIG. 3 that, the input manager may manage a pressure-touch event for a first control 31 and a second control 32.

Step 308: The inner program performs a predetermined operation by using the input manager according to the pressure-touch event.

Optionally, the input manager parses the pressure-touch event to obtain operation coordinates and a pressure value; the input manager determines an input control corresponding to the operation coordinates; and the input manager performs, when the pressure value is greater than a predetermined threshold, a first operation corresponding to the input control; or the input manager performs, when the pressure value is less than the predetermined threshold, a second operation corresponding to the input control.

Thus, according to the application program control method provided in one embodiment, a preset program modifies original message forwarding code in a virtual engine, so that after intercepting a pressure-touch event, a virtual engine first transfers the pressure-touch event to an outer program, and then the outer program transfers the pressure-touch event to an inner program. This may resolve the problem that the inner program of the application program cannot be directly run in an operating system, and can be normally run only after the outer program is added, but because of the existence of the outer program, the application program cannot directly process the pressure-touch event. Thus, the inner program can also receive the pressure-touch event, and an input manager in the inner program can also processes the pressure-touch event, to support control of a pressure-touch operation on an application program, and trigger a plurality of control instructions in a limited screen area of a mobile terminal, thereby improving man-machine interaction efficiency.

Figure 6:
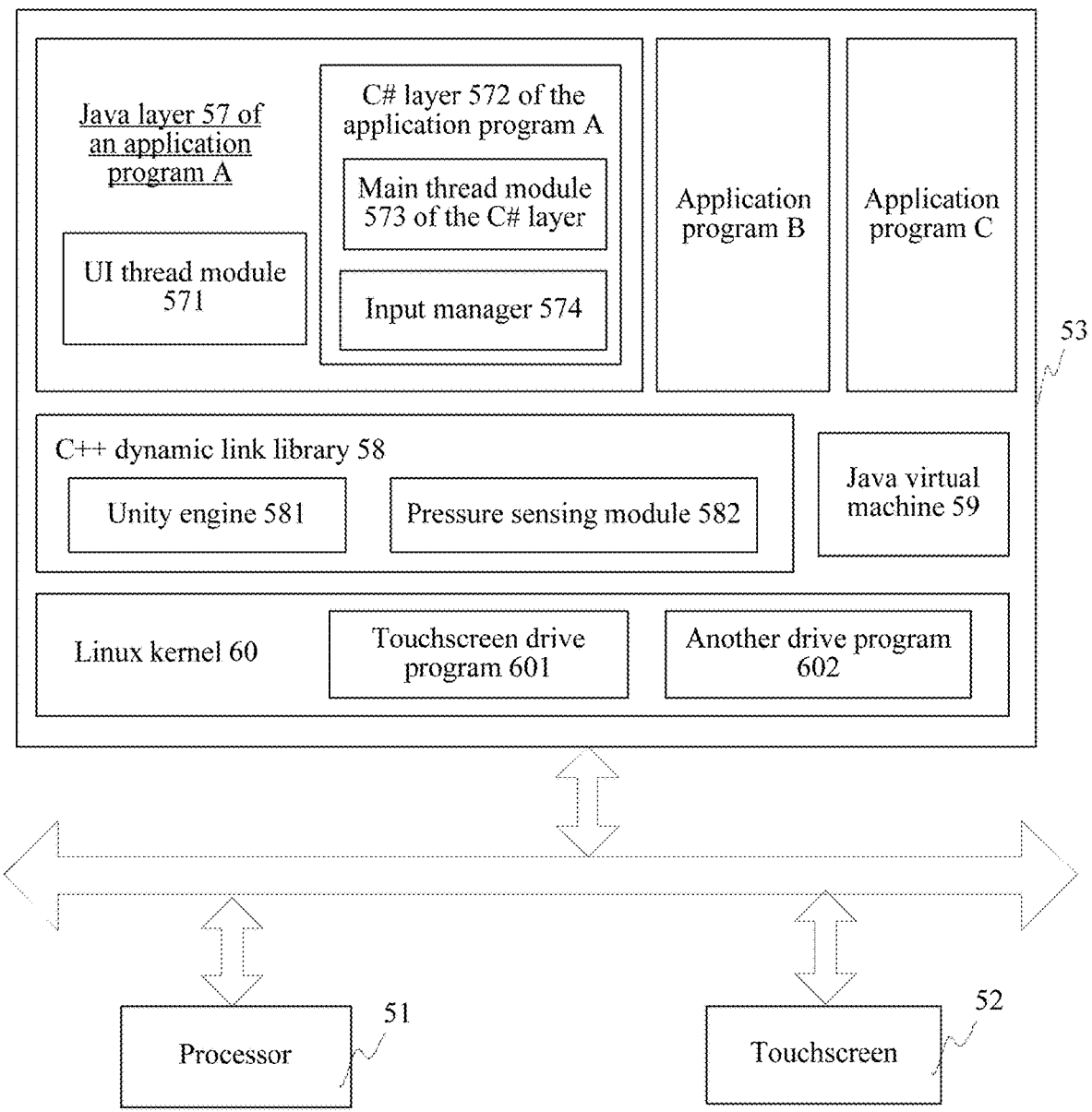
FIG. 6 is a schematic structural diagram of a terminal according to another exemplary embodiment of the present disclosure.

In a specific example, the first operating system used by the terminal FIG. 4 is an Android operating system. FIG. 6 is a schematic structural diagram of a terminal according to another exemplary embodiment of the present disclosure. When the terminal uses an Android operating system, an outer program of an application program A is a Java layer 57, and an inner program of the application program A is a C# layer 572. The Java layer of the application program A further includes a UI thread module 571. A virtual engine in a C++ dynamic link library 58 is a Unity engine 581. A pressure-sensing module 582 is configured to intercept a pressure-touch event, and the pressure-sensing module 582 includes a preset program. The preset program is configured to modify a message forwarding mechanism of the Unity engine. The Android operating system further includes a Java virtual machine 59. The Java virtual machine 59 is configured to provide a Java running environment for the application program A, an application program B, and an application program C.

Optionally, a Java language is a programming language supported by an application layer of the Android operating system, so that the outer program of the application program A is a program module of the Java layer. Optionally, a C# language is an original development language of the application program A, so that the inner program of the application program A is a program module of the C# layer.

A virtual machine is a virtualized and abstracted computer. A Java virtual machine has a complete hardware architecture, for example, a processor, a stack, and a register, and has a corresponding instruction system. The Java virtual machine can enable the Java program to generate only target code run on the Java virtual machine, so that the target code can be run on a plurality of platforms without modifications. In one embodiment, the Java virtual machine is configured to run various functions of the outer program of the application program

A.

The preset program has an address mapping capability. Address mapping is a process of converting a logical address in the application program into a physical address directly addressed by a machine during running.

Figure 7:
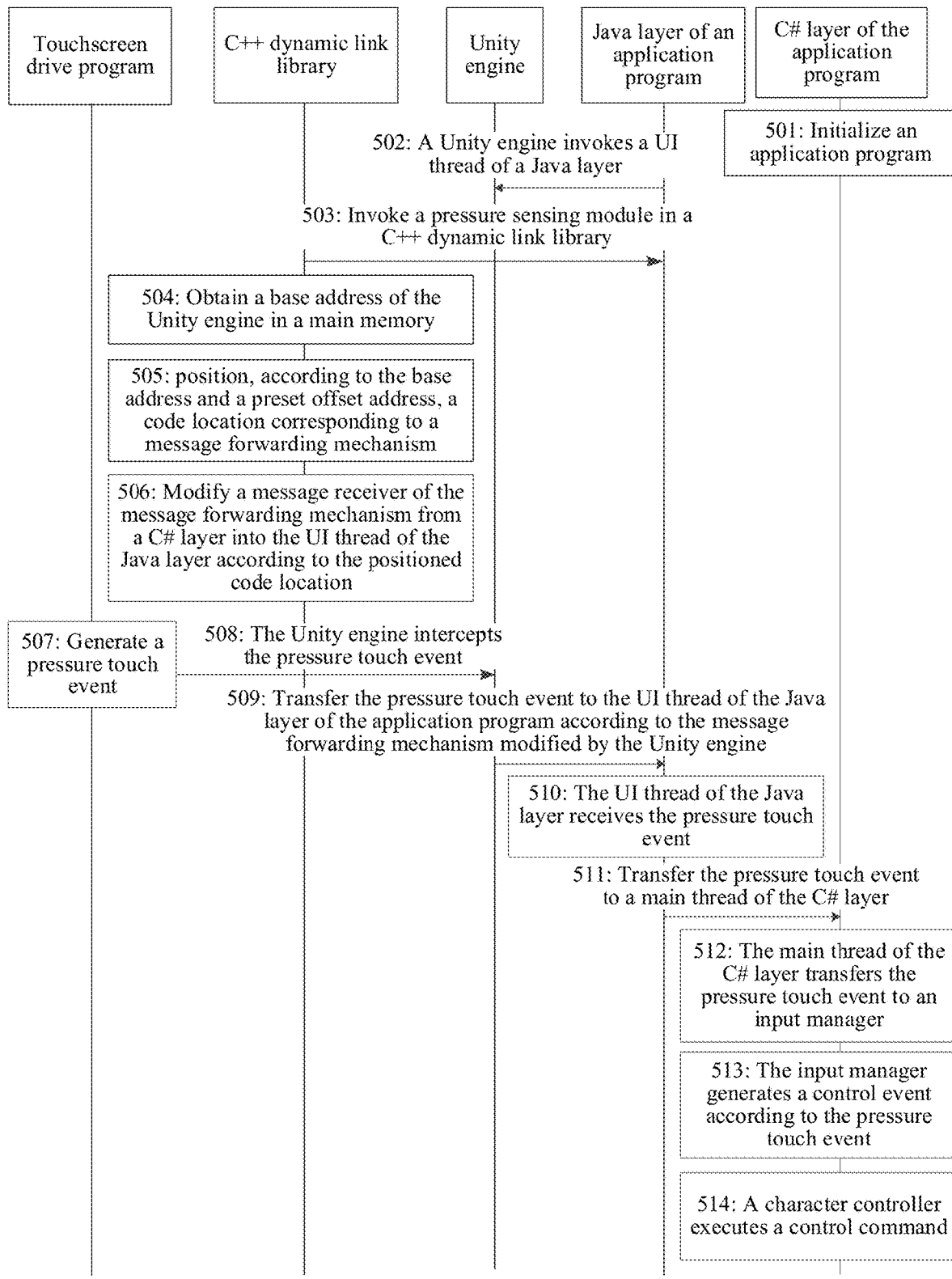
FIG. 7 is a flowchart of an application program control method according to another exemplary embodiment of the present disclosure.

FIG. 7 is a flowchart of an application program control method according to an exemplary embodiment of the present disclosure. In one embodiment, an example in which the application program control method is applied to the Android operating system shown in FIG. 6. The method includes the followings.

Step 501: The C# layer initializes an application program when the application program is started.

After a user taps an icon of an application program A, the application program A is started. The C# layer of the application program A performs initialization. The initialization includes starting a main thread in the C# layer and loading an image resource, an audio resource, logic code, and the like.

Step 502: The Unity engine invokes the UI thread of the Java layer.

When the application program needs to display a UI related to a three-dimensional virtual environment, the Unity engine generates a UI picture, and invokes the UI thread of the Java layer to display the UI picture.

Step 503: The UI thread of the Java layer loads the pressure-sensing module in the C++ dynamic link library.

In a process of displaying the UI picture, the UI thread of the Java layer dynamically loads the pressure-sensing module. The pressure-sensing module includes a preset program.

Step 504: The preset program obtains a base address of the Unity engine in the main memory.

The preset program obtains, from the Android operating system, the base address used when the Unity engine is run in the main memory. The preset program may obtain the base address of the Unity engine in the main memory in a disassembly form.

Step 505: The preset program positions, according to the base address and a preset offset address, a code location corresponding to the message forwarding code.

The message forwarding code is message forwarding code preset in the Unity engine. The message forwarding code is used for forwarding an intercepted pressure-touch event to an inner program.

The preset program determines the code location of the message forwarding code in the main memory according to the obtained base address and the preset offset address.

Step 506: The preset program modifies a message receiver of the message forwarding code from the C# layer into the UI thread of the Java layer according to the positioned code location.

Because the inner program of the application program A is the C# layer, that is, a development language used by the application program A is a C# language, and a development language of the outer program is a Java language. Without using the Java layer, the C# layer cannot obtain the pressure-touch event. Therefore, the pressure-touch event first needs to be transferred to the UI thread of the Java layer, and then transferred by the UI thread of the Java layer to the C# layer.

After determining the code location of the message forwarding code, the preset program modifies the message receiver of the message forwarding code from the C# layer into the UI thread of the Java layer.

Step 507: The touchscreen drive program generates a pressure-touch event when receiving a pressure-touch operation.

Step 508: The Unity engine intercepts the pressure-touch event.

When the user uses the application program A, a UI of the application program A is displayed on the touchscreen of the terminal. The UI includes a control used for man-machine interaction, for example, a virtual button. When the user performs a pressure-touch operation on the touchscreen, the touchscreen drive program of the terminal generates a pressure-touch event, and reports the pressure-touch event to the pressure-sensing module. The Unity engine intercepts the pressure-touch event.

Step 509: The Unity engine transfers the pressure-touch event to the UI thread of the Java layer according to the modified message forwarding code.

In one embodiment, because in the modified message forwarding code, a destination address of the pressure-touch event is modified from the C# layer into the Java layer, the Unity engine transfers the pressure-touch event to the UI thread of the Java layer by using the message forwarding code.

Step 510: The UI thread of the Java layer receives the pressure-touch event.

Step 511: The UI thread of the Java layer sends the pressure-touch event to the main thread of the C# layer.

When the application program A is a game application program, the main thread is a main thread configured to implement main running logic of the game application program.

Step 512: The main thread of the C# layer transfers the pressure-touch event to the input manager of the C# layer.

The input manager is a program module in the C# layer that is responsible for processing an external input signal. For example, the input manager is configured to manage a pressure-touch event triggered by a virtual key displayed on the UI. It can be learned by referring to FIG. 3 that, the input manager may manage a pressure-touch event for a first control 31 and a second control 32.

Step 513: The input manager generates a control instruction according to the pressure-touch event.

Figure 8:
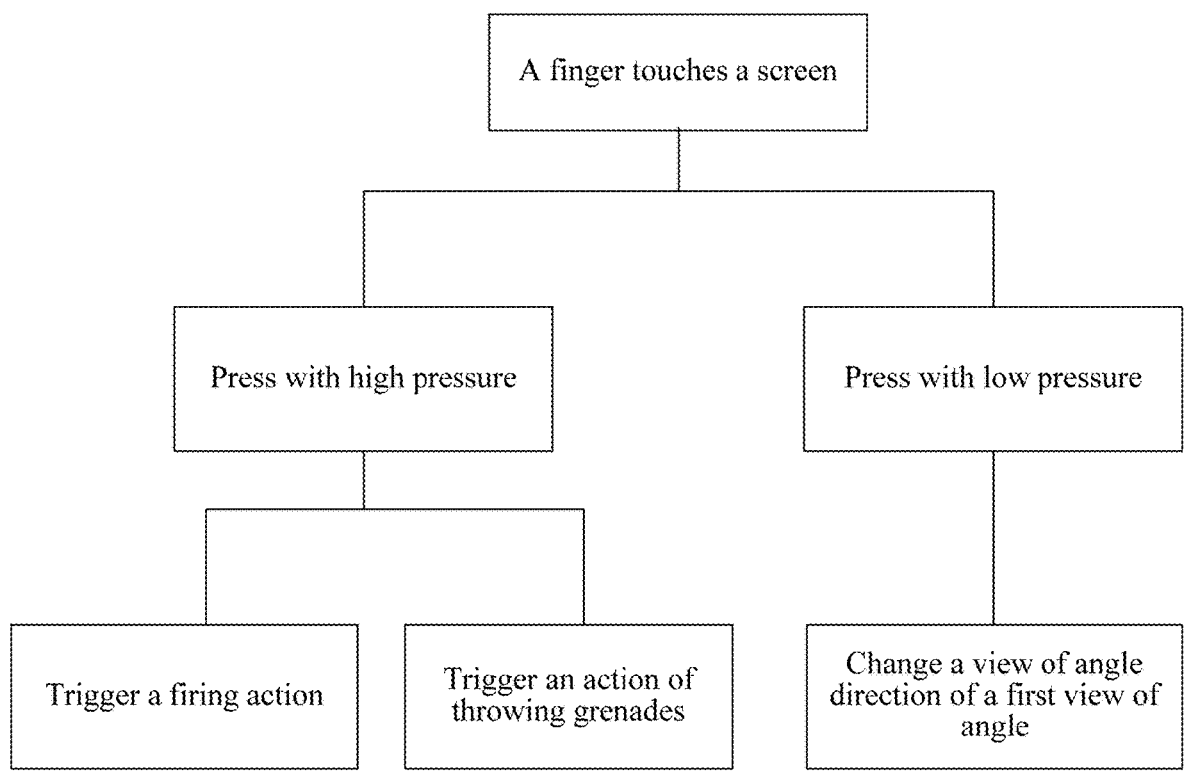
FIG. 8 is an input control method according to another exemplary embodiment of the present disclosure.

Optionally, the input manager parses the pressure-touch event to obtain operation coordinates and a pressure value; the input manager determines an input control (for example, the second control) corresponding to the operation coordinates; and the input manager generates, when pressure value is greater than a predetermined threshold, a first operation instruction corresponding to the input control, for example, changing a view of angle direction of a first view of angle; or the input manager generates, when the pressure value is less than the predetermined threshold, a second operation corresponding to the input control, for example, firing a weapon or throwing a grenade, as shown in FIG. 8.

Step 514: A character controller executes the control instruction.

Optionally, when the application program is a game application program, the inner program further includes a character controller configured to control a game character. When the input manager generates the first operation instruction, the character controller executes the first operation instruction. When the input manager generates the second operation instruction, the character controller executes the second operation instruction.

In some other embodiments, the terminal uses the second operating system. A difference from the first operating system lies in that the second operating system is a system having a set of native GUI components. The GUI component has a complete set of message dispatching modules. The GUI component is configured to report, after a pressure-touch event is reported by the touchscreen drive program to the GUI component, the pressure-touch event to the application layer. The second operating system includes an iOS operating system. In this case, the virtual engine needs to intercept the pressure-touch event from the message dispatching module in the GUI component.

Figure 9:
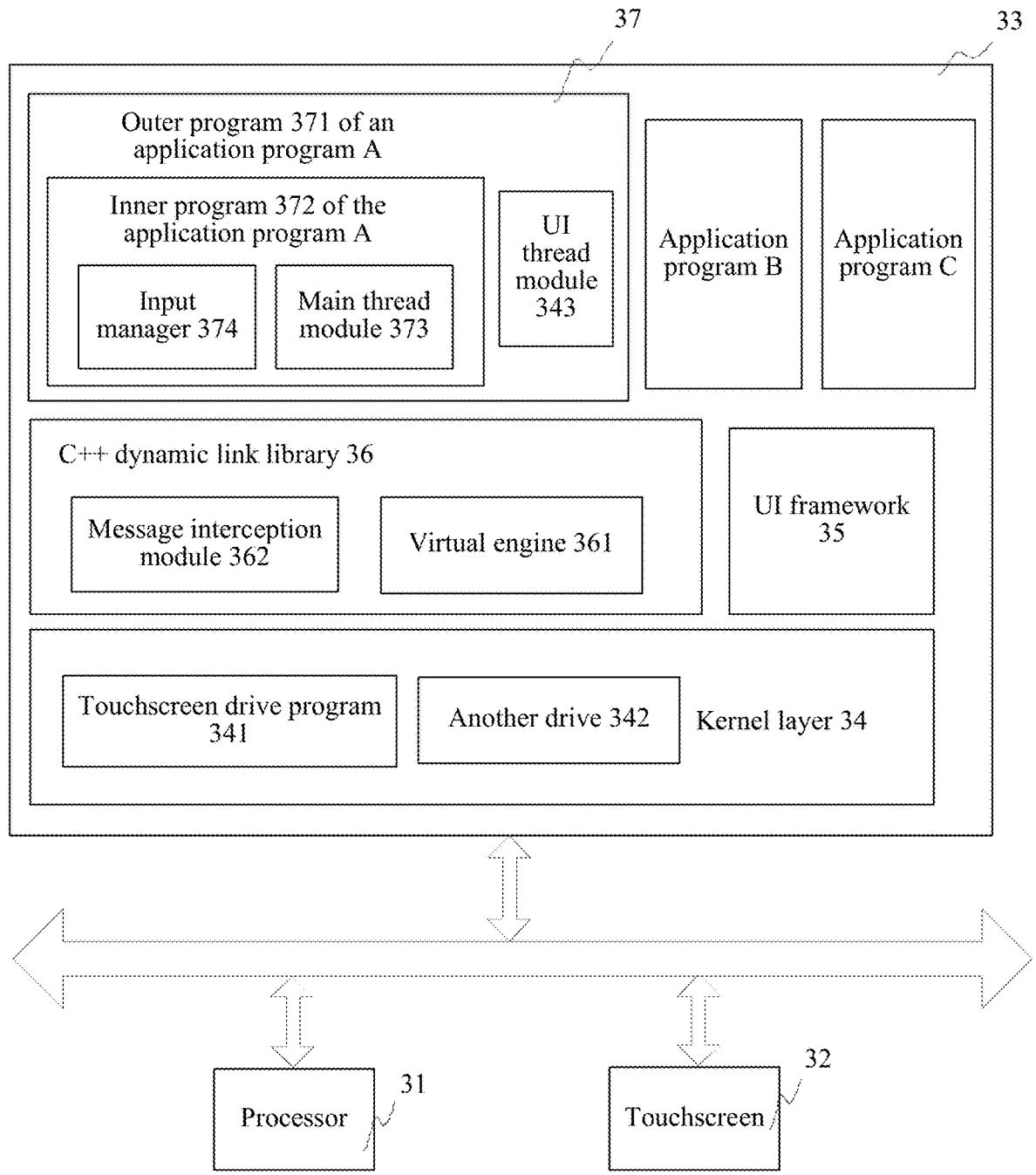
FIG. 9 is a schematic structural diagram of a terminal according to another exemplary embodiment of the present disclosure.

FIG. 9 is a schematic structural diagram of a terminal according to another exemplary embodiment of the present disclosure. For example, an example in which the terminal uses a second operating system is used. The terminal includes a processor 31, a touchscreen 32, and a memory 33. The memory 33 stores at least one program instruction.

The processor 31 may be at least one of a single-core processor, a multi-core processor, an embedded chip, and a processor having an instruction running capability.

The touchscreen 32 is a pressure-sensing touchscreen. The pressure-sensing touchscreen may measure pressing strength on the touchscreen 32.

The memory 33 stores an executable program of the processor 31. For example, a program instruction stored in the memory 33 includes a kernel layer 34, a UI framework 35, a C++ dynamic link library 36, and an application layer 37.

The kernel layer 34 includes a touchscreen drive program 341 and another drive program 342. The touchscreen drive program 341 is configured to generate a pressure-touch event when a pressure-touch operation is received on the touchscreen 32. The pressure-touch event includes operation coordinates and a pressure value. The touchscreen drive program 341 is further configured to report the pressure-touch event to the UI framework 35.

The UI framework 35 is a framework provided by the operating system, and is an interface display framework configured to implement man-machine interaction. A message dispatching module is provided in the UI framework 35. When receiving the pressure-touch event, the UI framework 35 dispatches the pressure-touch event to a corresponding application program.

The C++ dynamic link library 36 includes a virtual engine 361 and a message interception module 362. The virtual engine 361 is configured to construct and display a three-dimensional virtual environment. The message interception module 362 is configured to intercept the pressure-touch event from the UI framework 35. Optionally, the message interception module 362 is a part of the virtual engine 361. The virtual engine 361 transfers the pressure-touch event to an outer program of the application program A after intercepting the pressure-touch event by using the message interception module 362.

The application program A is an application program developed based on the virtual engine. The application program A includes an outer program 371 and an inner program 372. The inner program 372 includes a main thread module 373 and an input manager 374. The input manager 374 is a program module configured to process an external input signal (for example, the pressure-touch event).

Figure 10:
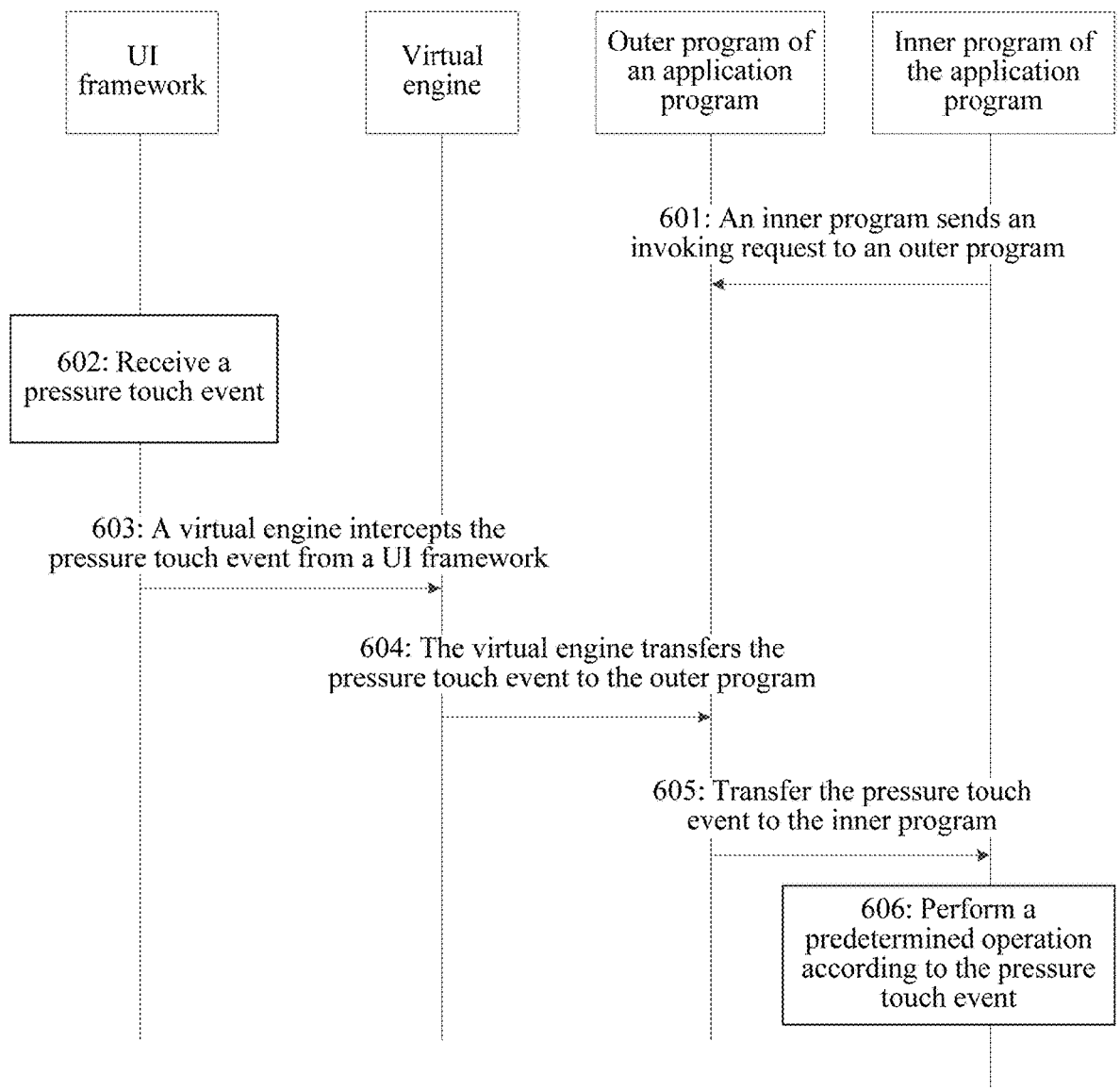
FIG. 10 is a flowchart of an application program control method according to another exemplary embodiment of the present disclosure.

FIG. 10 is a flowchart of an application program control method according to an exemplary embodiment of the present disclosure. In one embodiment, an example in which the application program control method is applied to the terminal shown in FIG. 9 is used for description. The method includes the followings.

Step 601: The inner program sends an invoking request to the outer program, where the invoking request is used to instruct the outer program to forward a pressure-touch event to the inner program when receiving the pressure-touch event.

Step 602: The UI framework receives the pressure-touch event.

When a user uses the application program A, a UI of the application program A is displayed on the touchscreen of the terminal. The UI includes a control used for man-machine interaction, for example, a virtual button. When the user performs a pressure-touch operation on the touchscreen, the touchscreen drive program of the terminal generates a pressure-touch event, and reports the pressure-touch event to the UI framework.

Correspondingly, the UI framework receives the pressure-touch event.

Step 603: The virtual engine intercepts the pressure-touch event from the UI framework.

Step 604: The virtual engine transfers the pressure-touch event to the outer program.

Step 605: The outer program transfers the pressure-touch event to the inner program.

Step 606: The inner program performs a predetermined operation according to the pressure-touch event.

For example, a first predetermined operation is performed when a pressure value of the pressure-touch event is greater than a preset threshold; or a second predetermined operation is performed when a pressure value of the pressure-touch event is less than a preset threshold.

Thus, according to the application program control method provided in one embodiment, an inner program sends an invoking request to an outer program in advance, to trigger the outer program to forward a pressure-touch event to the inner program when receiving the pressure-touch event; and then the inner program performs a preset operation according to the pressure-touch event. This may resolve a problem that the inner program of the application program cannot be directly run in an operating system, and can be normally run only after the outer program is added, but because of the existence of the outer program, the application program cannot directly process the pressure-touch event to implement input control by using a pressure-touch technology in an application program developed based on a virtual engine, and trigger a plurality of operation instructions in a limited screen area of a mobile terminal, thereby improving man-machine interaction efficiency.

Figure 11:
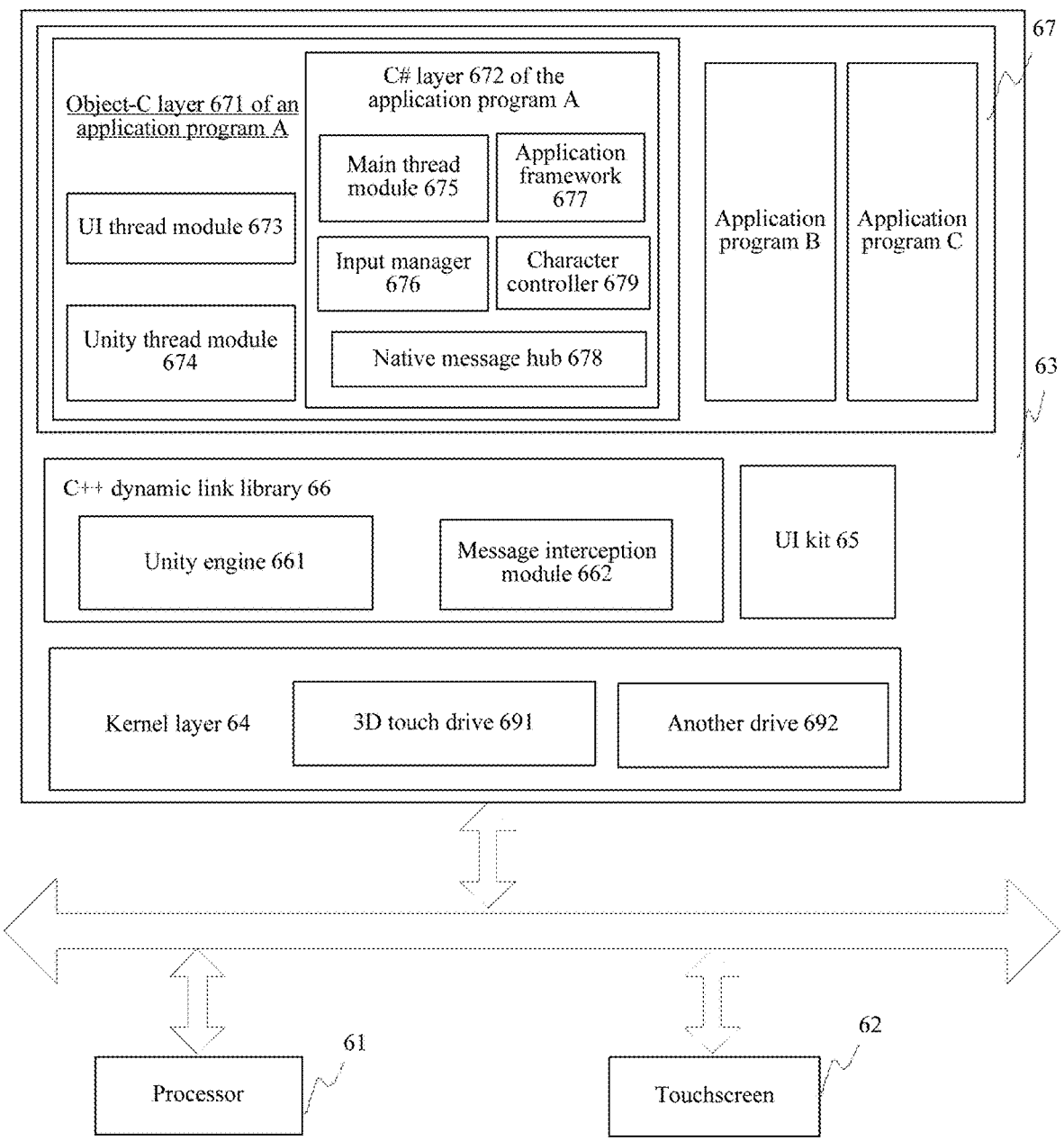
FIG. 11 is a schematic structural diagram of a terminal according to another exemplary embodiment of the present disclosure.

FIG. 11 is a schematic structural diagram of a terminal according to another exemplary embodiment of the present disclosure. For example, an example in which a second operating system used by the terminal is an iOS operating system is used. The terminal includes a processor 61, touchscreen 62, and a memory 63. The memory 63 stores at least one program instruction.

The processor 61 may be at least one of a single-core processor, a multi-core processor, an embedded chip, and a processor having an instruction running capability.

The touchscreen 62 is a pressure-sensing touchscreen. The pressure-sensing touchscreen may measure pressing strength on the touchscreen 62.

The memory 63 stores an executable program of the processor 61. For example, a program instruction stored in the memory 63 includes a kernel layer 64, a UI kit 65, a C++ dynamic link library 66, and an application layer 67.

The kernel layer 64 includes a touchscreen drive program 641 and another drive program 642. The touchscreen drive program 641 is configured to generate a pressure-touch event when a pressure-touch operation is received on the touchscreen 62. The pressure-touch event includes operation coordinates and a pressure value. The touchscreen drive program 641 is further configured to report the pressure-touch event to the UI kit 65.

The UI kit 65 is a framework provided by the iOS operating system, and is an interface display framework configured to implement man-machine interaction. A message dispatching module is provided in the UI kit 65. When receiving the pressure-touch event, the UI kit 65 dispatches the pressure-touch event to a corresponding program module.

The C++ dynamic link library 66 includes a Unity engine 661 and a message interception module 662. The Unity engine 661 is configured to construct and display a three-dimensional virtual environment. The message interception module 662 is configured to intercept the pressure-touch event from the UI kit 65. Optionally, the message interception module 662 is a part of the Unity engine 661. The Unity engine 661 transfers the pressure-touch event to an outer program of the application program A after intercepting the pressure-touch event by using the message interception module 662.

The application program A is an application program developed based on the Unity engine. The application program A includes an Object-C layer 671 and a C# layer 672. The Object-C layer 671 includes a UI thread module 673 and a Unity thread module 674. The C# layer 672 includes a main thread module 675, an input manager 676, an application framework 677, a native message hub (NativeMsgHub) 678, and a character controller 679. The input manager 676 is a program module configured to process an external input signal (for example, the pressure-touch event). The application framework (FrameWork) 677 is configured to implement main running logic of the application program A. When the application program A is a game application, the application framework 677 is a game application framework. The native message hub 678 is configured to implement invoking with the Object-C layer 671. The character controller 679 is configured to: execute a control instruction generated by the input manager 676, and control a game character.

Figure 12:
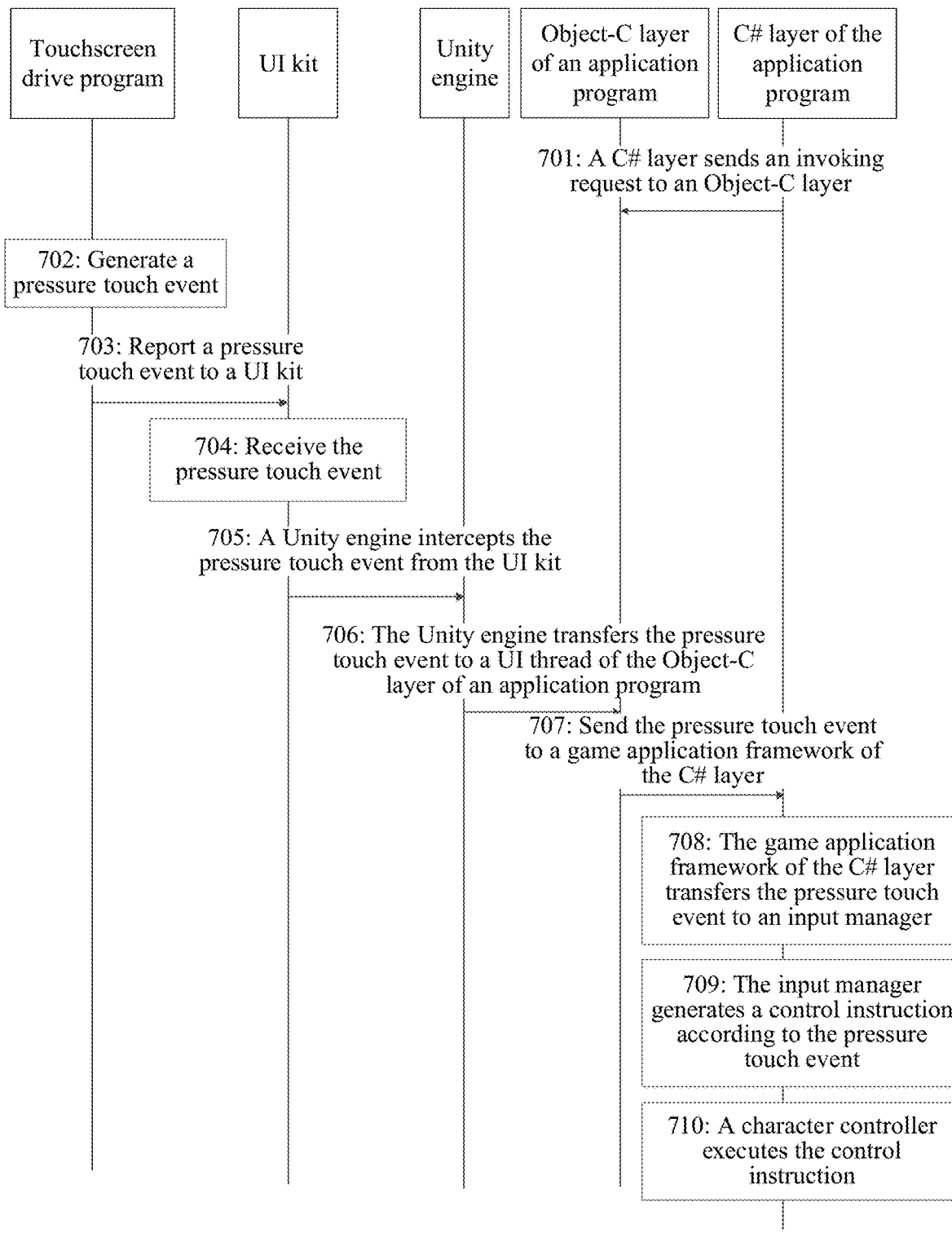
FIG. 12 is a flowchart of an application program control method according to another exemplary embodiment of the present disclosure.

FIG. 12 is a flowchart of an application program control method according to an exemplary embodiment of the present disclosure. In one embodiment, an example in which the application program control method is applied to the terminal shown in FIG. 11 is used for description. The method includes the followings.

Step 701: The C# layer sends an invoking request to the Object-C layer, where the invoking request is used to instruct the Object-C layer to forward a pressure-touch event to the C# layer when receiving the pressure-touch event.

After the application program is started, the main thread module (also referred to as a Unity Mono C# thread) of the C# layer sends the invoking request to the Object-C layer. The invoking request is used to query whether the terminal supports a pressure-touch function. When the terminal supports the pressure-touch function, the Object-C layer needs to forward the pressure-touch event to the C# layer when receiving the pressure-touch event.

Figure 13:
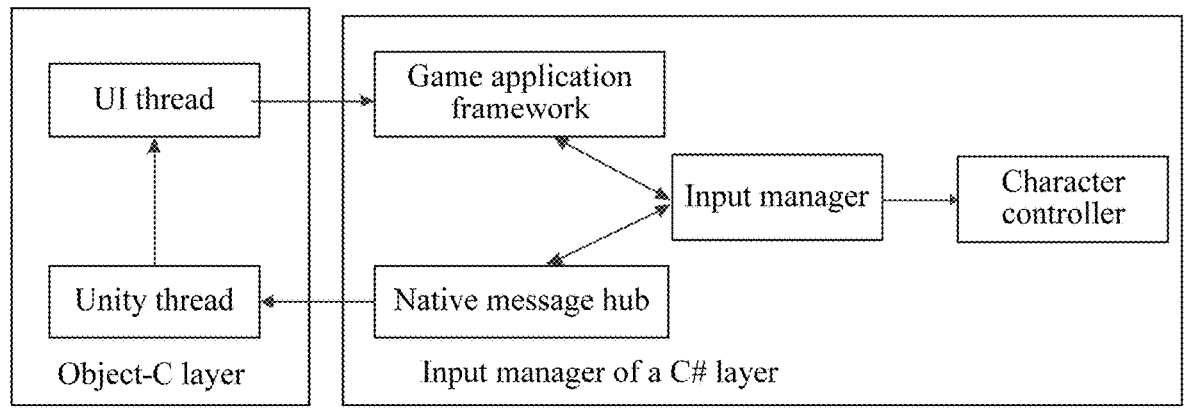
FIG. 13 is an application program implementation diagram according to another exemplary embodiment of the present disclosure.

Optionally, the input manager of the C# layer sends the invoking request to the Unity thread of the Object-C layer by using the native message hub. The Unity thread forwards the invoking request to the UI thread through thread safety asynchronous invoking. The UI thread is configured to forward the pressure-touch event to the application framework of the C# layer when receiving the pressure-touch event, as shown in FIG. 13.

Step 702: The touchscreen drive program generates a pressure-touch event when receiving the pressure-touch operation.

When the user uses the application program A, a UI of the application program A is displayed on the touchscreen of the terminal. The UI includes a control used for man-machine interaction, for example, a virtual button. When the user performs a pressure-touch operation on the touchscreen, the touchscreen drive program of the terminal generates a pressure-touch event.

Step 703: The touchscreen drive program reports the pressure-touch event to the UI kit.

Step 704: The UI kit receives the pressure-touch event.

Step 705: The Unity engine intercepts the pressure-touch event from the UI kit.

The Unity engine intercepts the pressure-touch event from the UI kit by using the message interception module.

Step 706: The Unity engine transfers the pressure-touch event to the UI thread of the Object-C layer.

Step 707: The UI thread of the Object-C layer transfers the pressure-touch event to the game application framework of the C# layer.

Step 708: The game application framework of the C# layer forwards the pressure-touch event to the input manager of the C# layer.

Step 709: The input manager of the C# layer generates a control instruction according to the pressure-touch event.

Optionally, the input manager parses the pressure-touch event to obtain operation coordinates and a pressure value; the input manager determines an input control (for example, a second control) corresponding to the operation coordinates; and the input manager generates, when pressure value is greater than a predetermined threshold, a first operation instruction corresponding to the input control, for example, changing a view of angle direction of a first view of angle; or the input manager generates, when the pressure value is less than the predetermined threshold, a second operation corresponding to the input control, for example, firing, as shown in FIG. 8.

Step 710: The character controller of the C# layer executes the control instruction.

Optionally, when the application program is a game application program, the inner program further includes a character controller configured to control a game character. When the input manager generates the first operation instruction, the character controller executes the first operation instruction. When the input manager generates the second operation instruction, the character controller executes the second operation instruction.

Figure 14:
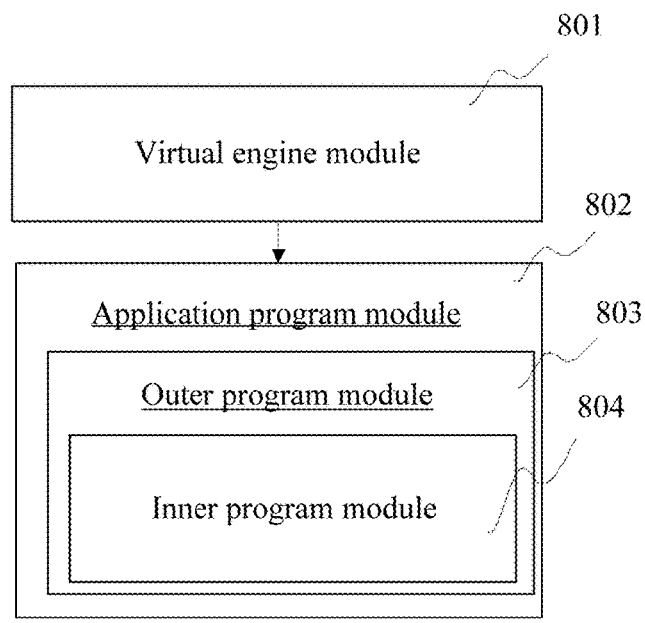
FIG. 14 is a block diagram of an application program control apparatus according to an exemplary embodiment of the present disclosure.

FIG. 14 is a block diagram of an application program control apparatus according to an exemplary embodiment of the present disclosure. The application program control apparatus may be implemented by software, hardware, and/or a combination thereof, as all or a part of the terminal. An operating system and an application program are installed in the apparatus. The apparatus includes one or more processors and one or more memories storing a program unit. The program unit is executed by the processor. The program unit includes a virtual engine module 801, an application program module 802, an outer application program module 803, and an inner application program module 804, etc.

The virtual engine module 801 is configured to intercept a pressure-touch event, the pressure-touch event including operation coordinates and a pressure value; and configured to transfer the pressure-touch event to the outer program module.

The application program module 802 is configured to include an outer program module and an inner program module. The outer application program module 803 is configured to transfer the pressure-touch event to the inner program module. The inner application program module 804 is configured to perform a predetermined operation according to the pressure-touch event.

In an embodiment, the outer program module is configured to send the pressure-touch event to a main thread in the inner program module. The inner program module is configured to transfer the pressure-touch event to an input controller in the inner program module by using the main thread. The input controller is a program module in the inner program module that is configured to process an external input signal.

In an optional embodiment, the program unit further includes a preset program module; and the preset program module is configured to modify a message receiver of a message forwarding mechanism in the virtual engine from the inner program module into the outer program module when the application program is started. The virtual engine module is configured to transfer the pressure-touch event to the outer program module according to the message forwarding mechanism modified by the preset program module.

In an embodiment, the preset program module is configured to: obtain a base address of the virtual engine module in a main memory when the application program is started; determine, according to the base address and a preset offset address, a code location corresponding to the message forwarding mechanism; and modify an address of the message receiver of the message forwarding mechanism from the inner program module into the outer program module according to the positioned code location.

In an embodiment, the inner program module is further configured to send an invoking request to the outer program module, where the invoking request is used to instruct the outer program module to forward the pressure-touch event to the inner program module when receiving the pressure-touch event.

In an embodiment, the program unit further includes a system-level UI framework; and the virtual engine module is configured to intercept the pressure-touch event from the system-level UI framework.

In an embodiment, the inner program module is configured to: parse the pressure-touch event to obtain the operation coordinates and the pressure value; determine an input control corresponding to the operation coordinates; and perform, when the pressure value is greater than a predetermined threshold, a first operation corresponding to the input control; or perform, when the pressure value is less than the predetermined threshold, a second operation corresponding to the input control.

It should be noted that, when the application program control apparatus provided in the foregoing embodiment triggers an intelligent network service, division of the foregoing functional modules is merely used as an example for description. During actual application, the foregoing functions can be allocated to different functional modules and implemented according to a requirement, that is, the internal structure of a device is divided into different functional modules to implement all or some of the functions described above. In addition, the application program control apparatus provided in the foregoing embodiments and the embodiments of the application program control method belong to a same concept. For a specific implementation process of the application program control apparatus, refer to the method embodiments, and details are not described herein again.

An embodiment of the present disclosure further provides a terminal. The terminal includes a processor and a memory, the memory storing at least one instruction, and the instruction being loaded and executed by the processor to implement the application program control method according to any one of the foregoing embodiments.

An embodiment of the present disclosure further provides a computer-readable storage medium. The storage medium stores at least one instruction, the instruction being loaded and executed by a processor to implement the application program control method according to any one of the foregoing embodiments.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely exemplary embodiments of the present disclosure, but are not intended to limit the present disclosure. Any modification, equivalent replacement, or improvement made within the spirit and principle of the present disclosure shall fall within the protection scope of the present disclosure.

What is claimed is:

1. An application program control method for a terminal, wherein the terminal is installed with a virtual engine and an application program, the application program is a program developed based on the virtual engine, and the application program includes an outer program and an inner program, the method comprising:
   intercepting, by using the virtual engine, a pressure-touch event, the pressure-touch event comprising operation coordinates and a pressure value;
   transferring, by using the virtual engine, the pressure-touch event to the outer program;
   transferring, by using the outer program, the pressure-touch event to the inner program; and
   performing, by using the inner program, a predetermined operation according to the pressure-touch event.

2. The method according to claim 1, wherein:
   the outer program is a program developed by using a first programming language, and the inner program is a program developed by using a second programming language; and
   the transferring, by using the outer program, the pressure-touch event to the inner program comprises:
   sending, by using the outer program, the pressure-touch event to a main thread in the inner program; and
   transferring, by using the main thread of the inner program, the pressure-touch event to an input controller of the inner program, wherein
   the input controller is a program module configured to process an external input signal.

3. The method according to claim 1, wherein:
   the terminal uses a first operating system, and a preset program is further installed in the terminal;
   before the transferring the pressure-touch event to the outer program, the method further comprises:
   modifying, by using the preset program, a message receiver of message forwarding code in the virtual engine from the inner program into the outer program when the application program is started; and
   the transferring the pressure-touch event to the outer program comprises:
   transferring, by using the virtual engine, the pressure-touch event to the outer program according to the message forwarding code modified by the preset program.

4. The method according to claim 3, wherein the modifying, by using the preset program, a message receiver of message forwarding code in the virtual engine from the inner program into the outer program when the application program is started further comprises:
    obtaining, by using the preset program, a base address of the virtual engine in a main memory when the application program is started;
    positioning, by using the preset program and according to the base address and a preset offset address, a code location corresponding to the message forwarding code; and
    modifying, by using the preset program, an address of the message receiver of the message forwarding code from the inner program into the outer program according to the positioned code location.

5. The method according to claim 2, wherein the terminal uses a second operating system; and
    before the sending, by the outer program, the pressure-touch event to a main thread in the inner program, the method further comprises:
    sending, by using the inner program, an invoking request to the outer program, wherein the invoking request is used to instruct the outer program to forward the pressure-touch event to the inner program when receiving the pressure-touch event.

6. The method according to claim 5, wherein the second operating system comprises a system-level user interface (UI) framework; and
    the intercepting, by using the virtual engine, a pressure-touch event comprises:
    intercepting, by using the virtual engine, the pressure-touch event from the system-level UI framework.

7. The method according to claim 1, wherein the performing, by using the inner program, a predetermined operation according to the pressure-touch event comprises:
    parsing, by using the inner program, the pressure-touch event to obtain the operation coordinates and the pressure value;
    determining, by using the inner program, an input control corresponding to the operation coordinates; and
    performing, by using the inner program and when the pressure value is greater than a predetermined threshold, a first operation corresponding to the input control; or
    performing, by using the inner program and when the pressure value is less than the predetermined threshold, second operation corresponding to the input control.

8. An application program control apparatus, comprising:
    a memory storing computer program instructions; and
    one or more processors coupled to the memory and, when executing the computer program instructions, configured to perform:
    running a virtual engine and an application program, wherein the application program is a program developed based on the virtual engine, and the application program includes an outer program and an inner program;
    intercepting, by using the virtual engine, a pressure-touch event, the pressure-touch event comprising operation coordinates and a pressure value;
    transferring, by using the virtual engine, the pressure-touch event to the outer program;
    transferring, by using the outer program, the pressure-touch event to the inner program; and
    performing, by using the inner program, a predetermined operation according to the pressure-touch event.

9. The apparatus according to claim 8, wherein:
    the outer program is a program developed by using a first programming language, and the inner program is a program developed by using a second programming language; and
    the transferring, by using the outer program, the pressure-touch event to the inner program comprises:
    sending, by using the outer program, the pressure-touch event to a main thread in the inner program; and
    transferring, by using the main thread of the inner program, the pressure-touch event to an input controller of the inner program, wherein
    the input controller is a program module configured to process an external input signal.

10. The apparatus according to claim 8, wherein:
    the terminal uses a first operating system, and a preset program is further installed in the terminal;
    before the transferring the pressure-touch event to the outer program, the method further comprises:
    modifying, by using the preset program, a message receiver of message forwarding code in the virtual engine from the inner program into the outer program when the application program is started; and
    the transferring the pressure-touch event to the outer program comprises:
    transferring, by using the virtual engine, the pressure-touch event to the outer program according to the message forwarding code modified by the preset program.

11. The apparatus according to claim 10, wherein the modifying, by using the preset program, a message receiver of message forwarding code in the virtual engine from the inner program into the outer program when the application program is started further comprises:
    obtaining, by using the preset program, a base address of the virtual engine in a main memory when the application program is started;
    positioning, by using the preset program and according to the base address and a preset offset address, a code location corresponding to the message forwarding code; and
    modifying, by using the preset program, an address of the message receiver of the message forwarding code from the inner program into the outer program according to the positioned code location.

12. The apparatus according to claim 9, wherein the terminal uses a second operating system; and
    before the sending, by the outer program, the pressure-touch event to a main thread in the inner program, the method further comprises:
    sending, by using the inner program, an invoking request to the outer program, wherein the invoking request is used to instruct the outer program to forward the pressure-touch event to the inner program when receiving the pressure-touch event.

13. The apparatus according to claim 12, wherein the second operating system comprises a system-level user interface (UI) framework; and
    the intercepting, by using the virtual engine, a pressure-touch event comprises:
    intercepting, by using the virtual engine, the pressure-touch event from the system-level UI framework.

14. The apparatus according to claim 8, wherein the performing, by using the inner program, a predetermined operation according to the pressure-touch event comprises:
    parsing, by using the inner program, the pressure-touch event to obtain the operation coordinates and the pressure value;

determining, by using the inner program, an input control corresponding to the operation coordinates; and performing, by using the inner program and when the pressure value is greater than a predetermined threshold, a first operation corresponding to the input control; or performing, by using the inner program and when the pressure value is less than the predetermined threshold, second operation corresponding to the input control.

15. A non-transitory computer-readable storage medium storing computer program instructions executable by at least one processor to perform:

running a virtual engine and an application program, wherein the application program is a program developed based on the virtual engine, and the application program includes an outer program and an inner program;

intercepting, by using the virtual engine, a pressure-touch event, the pressure-touch event comprising operation coordinates and a pressure value;

transferring, by using the virtual engine, the pressure-touch event to the outer program;

transferring, by using the outer program, the pressure-touch event to the inner program; and performing, by using the inner program, a predetermined operation according to the pressure-touch event.

16. The non-transitory computer-readable storage medium according to claim 15, wherein:

the outer program is a program developed by using a first programming language, and the inner program is a program developed by using a second programming language; and the transferring, by using the outer program, the pressure-touch event to the inner program comprises:

sending, by using the outer program, the pressure-touch event to a main thread in the inner program; and transferring, by using the main thread of the inner program, the pressure-touch event to an input controller of the inner program, wherein the input controller is a program module configured to process an external input signal.

17. The non-transitory computer-readable storage medium according to claim 15, wherein:

the terminal uses a first operating system, and a preset program is further installed in the terminal;

before the transferring the pressure-touch event to the outer program, the method further comprises:

modifying, by using the preset program, a message receiver of message forwarding code in the virtual engine from the inner program into the outer program when the application program is started; and the transferring the pressure-touch event to the outer program comprises:

transferring, by using the virtual engine, the pressure-touch event to the outer program according to the message forwarding code modified by the preset program.

18. The non-transitory computer-readable storage medium according to claim 17, wherein the modifying, by using the preset program, a message receiver of message forwarding code in the virtual engine from the inner program into the outer program when the application program is started further comprises:

obtaining, by using the preset program, a base address of the virtual engine in a main memory when the application program is started;

positioning, by using the preset program and according to the base address and a preset offset address, a code location corresponding to the message forwarding code; and modifying, by using the preset program, an address of the message receiver of the message forwarding code from the inner program into the outer program according to the positioned code location.

\* \* \* \* \*